United States Patent [19]

Kunz

[11] Patent Number: 5,511,711
[45] Date of Patent: Apr. 30, 1996

[54] CAMOUFLAGED GUN HOLDER FOR A VEHICLE

[76] Inventor: Richard F. Kunz, 1464 Madera Rd., Unit N, Suite 306, Simi Valley, Calif. 93065

[21] Appl. No.: 258,199

[22] Filed: Jun. 10, 1994

[51] Int. Cl.[6] ................................................ B60R 11/00
[52] U.S. Cl. .................................... 224/539; 224/912
[58] Field of Search ........................... 224/42.42, 273, 224/311, 912, 913, 483, 539; 446/408, 405; 297/188.18, 188.19

[56] References Cited

U.S. PATENT DOCUMENTS

| | | | |
|---|---|---|---|
| 3,589,062 | 6/1971 | Desmond | 446/408 X |
| 4,721,205 | 1/1988 | Burt et al. | 206/317 |
| 4,870,771 | 10/1989 | McClellan | 42/90 |
| 4,973,285 | 11/1990 | Diotte | 446/142 |
| 5,048,682 | 9/1991 | Taylor | 206/317 |
| 5,168,994 | 12/1992 | Beletsky et al. | 206/317 |
| 5,205,447 | 4/1993 | Hambrick | 224/42.42 |

OTHER PUBLICATIONS

Guns & Survival magazine, 1993, p. 31.
Guns & AMMO magazine, Oct. 1993, p. 112.
Guns Magazine, Oct. 1993, p. 117.
Handguns, Jun. 1994, pp. 19 and 22.
Handguns magazine, Jun. 1994, p. 80.
Hand Gunning magazine, May/Jun. 1994, p. 71.
Hand Gunning magazine, Sep./Oct. 1993, unnumbered page and p. 19.

*Primary Examiner*—Renee S. Luebke
*Attorney, Agent, or Firm*—Loeb and Loeb

[57] ABSTRACT

A camouflaged item holder for holding at least one item, such as a gun or the like, in a vehicle, such as a car or the like, includes a lid and a housing having an interior with an opening for holding at least one item. When the lid is in a closed position, the lid and housing appear like a single unit having a function other than holding an item, such that the presence of the at least one item inside the interior of the housing is camouflaged. The lid has the appearance of a portion of an electronic device and is dimensioned to cover the opening to the interior of the housing. The lid may be coupled to the housing by at least one hinge so that the lid can be opened and closed, and the housing may include at least one mounting structure that can couple the housing to the vehicle. The camouflaged gun holder may also include a lock mechanism to secure and lock the lid to the housing when the lid is in the closed position.

20 Claims, 3 Drawing Sheets

CAMOUFLAGED GUN HOLDER FOR A VEHICLE

FIELD OF THE INVENTION

This invention relates to gun holders and, in particular embodiments, a camouflaged gun holder that fits within a vehicle, such as a car, to hide the gun from view and maintain the gun in a readily accessible position.

BACKGROUND OF THE INVENTION

Various types of gun holders and mechanisms for securing a gun are available. For example, one of the earliest gun holders is the gun holster. The gun holster is typically worn around the gun owner's waist, and maintains the gun in a position that allows the owner to quickly withdraw the gun from the holster when needed. A drawback to the holster is that it only effectively holds the gun, for use, when the holster is worn by the gun owner. Moreover, the gun is often in plain view, which can raise tension levels in observers or draw unwanted attention to the gun owner. Furthermore, the quick access afforded by the holster also allows the gun to be easily stolen. To overcome some of these drawbacks, some holsters have been modified to be worn around a shoulder to keep a gun from view. However, the shoulder holster can be noticed by a trained observer and the shoulder holster may be uncomfortable to wear.

An alternative approach to the gun holster has been to secure a gun inside a gun case. The gun case is typically in the shape of a gun or a box and often has some type of locking mechanism attached to the gun case to secure the gun inside the gun case. A typical drawback is that a gun case is permanently affixed to a wall, a piece of furniture or the like. Therefore, the gun case cannot be easily moved from one location to another. Moreover, a gun case is often readily identifiable as a gun case, and thus, attention is drawn to the fact that a gun may be contained within the gun case.

SUMMARY OF THE DISCLOSURE

It is an object of an embodiment of the present invention to provide an improved gun holder, which obviates for practical purposes, the above mentioned limitations.

According to an embodiment of the invention, a camouflaged item holder for holding at least one item, such as a gun or the like, in a vehicle, such as a car, truck, boat, aircraft, RV or the like, includes a lid and a housing having an interior with an opening for holding at least one item. When the lid is in a closed position, the lid and housing appear like a single unit having a function other than holding an item, such that the presence of the at least one item inside the interior of the housing is camouflaged. The lid has the appearance of a portion of an electronic device, such as a cellular telephone, compact disk (CD) player, radio or the like.

In particular embodiments, the lid is coupled to the housing by at least one hinge so that the lid can be opened and closed, and the housing includes at least one mounting structure that can couple the housing to the vehicle.

In alternative embodiments, the camouflaged item holder further includes a lock mechanism to secure and lock the lid to the housing when the lid is in the closed position. In other embodiments, the portion of the device on the lid simulates an operable electronic device, while in still other embodiments, the portion of the device on the lid is an operable electronic device.

In preferred embodiments, the camouflaged item holder housing and lid are formed from a plastic material. Moreover, the interior of the housing contains a formed cushion to hold the item in a readily accessible position inside the interior of the holder. In particular embodiments, the formed cushion is formed from a spongy material to absorb shocks from movement of the vehicle.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
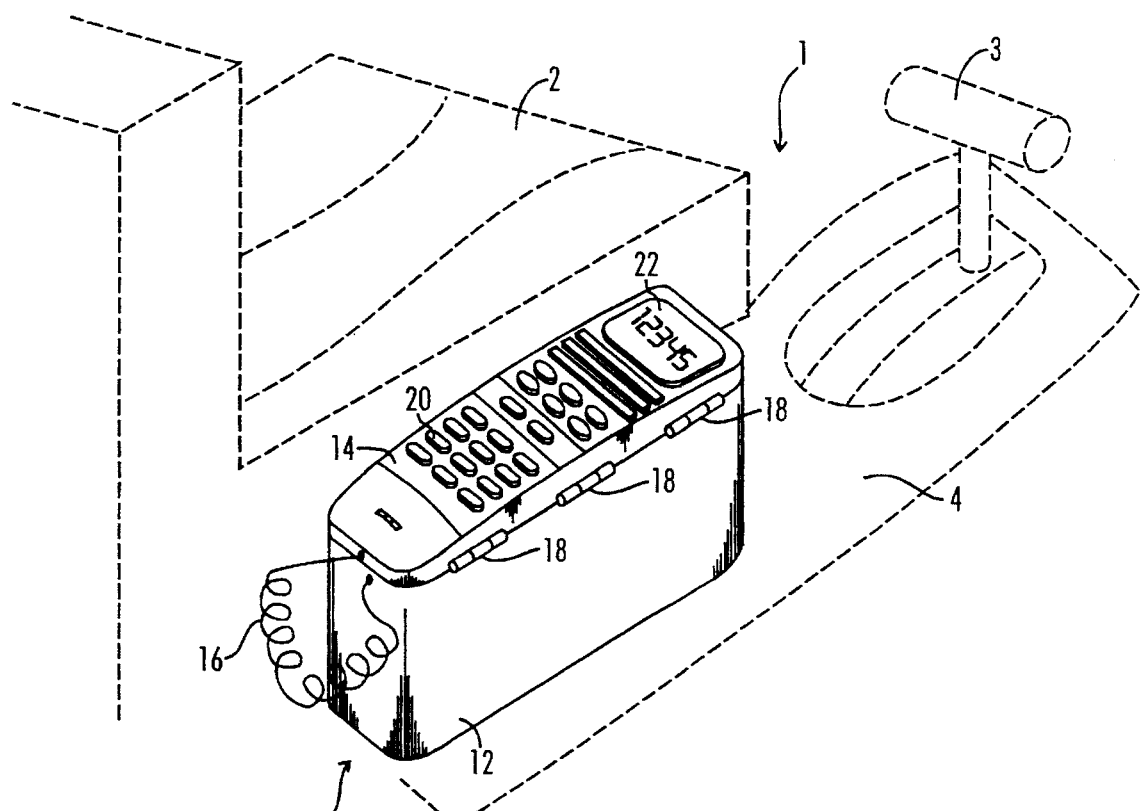
FIG. 1 is a perspective view of a camouflaged gun holder according to a first embodiment of the present invention.

For purposes of illustration, an embodiment of a camouflaged gun holder for use in a vehicle, such as a car or the like, is shown in the drawings.

In preferred embodiments of the present invention, the camouflaged gun holder is shaped to simulate the appearance of a cellular telephone for use in a car and maintains the gun in a position that facilitates access and retrieval of the gun by the gun owner. Thus, the camouflaged gun holder disguises the presence of a gun inside a holder that appears to perform a function other than holding a gun. However, it will be recognized that further embodiments of the invention may be used on other vehicles Such as planes, boats trucks, RVs or the like. Moreover alternative embodiments may be shaped to simulate the appearance of other items, such as a radio, CD player, arm rest or the like.

In still other embodiments, the camouflaged gun holder is actually incorporated inside an actual cellular telephone or other device. Moreover, the camouflaged gun holder may be adapted to hold items other than a gun, such as medications, jewelry or other valuables.

The camouflaged gun holder is primarily directed to gun owners having permits to carry concealed weapons, or off duty police officers, who do not want to carry a gun on their person. However, they still want to have their gun readily accessible, but held in an unobtrusive manner. In preferred embodiments, the camouflaged gun holder is firmly secured to the floor of a vehicle to prevent the camouflaged gun holder from changing position or being removed from the vehicle. Moreover, the camouflaged gun holder has a protective lid that simulates an electronic device, such as a cellular phone, to protect and hide the enclosed gun and which is opened to expose the camouflaged gun to view.

In particular embodiments, the interior of the camouflaged gun holder is shaped to accept and hold a single gun in an orientation that facilitates the quick removal of the gun when needed by the gun owner. The interior is provided with a cushioned material to prevent damage to the gun surfaces and to substantially eliminate noise if the gun shakes during motion of the vehicle. The opening to the interior of the camouflaged gun holder is of a sufficiently large size to enable the gun owner to easily grasp and remove the gun.

FIG. 1 shows a perspective view of a camouflaged gun holder 10 for holding a gun (shown at 9 in FIG. 5) in accordance with a first embodiment of the present invention. The illustrated camouflaged gun holder 10 simulates the appearance of a cellular telephone in a vehicle such as a car or the like. Preferably, the camouflaged gun holder 10 is mounted in a vehicle 1, next to a seat 2, behind a transmission control 3 on the floor 4 of the vehicle. Thus, the camouflaged gun holder 10 appears as an ordinary accessory to a gun owner's vehicle 1, without drawing attention to the fact that a gun may be contained within the camouflaged gun holder 10. However, it should be recognized that FIG. 1 illustrates one mounting configuration. Moreover, in alternative embodiments, the camouflaged gun holder 10 may be mounted in other areas of the vehicle without departing from the scope of the present invention.

As shown in FIGS. 1–5, the camouflaged gun holder 10 includes a gun holding housing 12, a simulated cellular telephone lid 14, a telephone cable 16 and a plurality of hinges 18. The gun holding housing 12 is coupled to the simulated cellular telephone lid 14 by the telephone cable 16. The housing 12 is also coupled to the telephone lid 14 by a plurality of hinges 18, which allow the telephone lid 14 to rotate and open to the side, providing easy access to a gun 9 contained within the housing 12. In preferred embodiments, the housing 12 is formed from a plastic material, such as polyethylene or the like. However, in alternative embodiments, the housing 12 may be formed from metal, wood, laminates of metal and plastic, laminates of metal or plastic covered with fabric or leather, or the like.

In preferred embodiments, the telephone lid 14 is formed from a plastic material, such as polyethylene or the like. The telephone lid 14 also includes non-movable buttons 20 and a mock LCD display 22. However, in alternative embodiments, the telephone lid 14 may be formed out of metal or metal and plastic laminates. Moreover, the buttons 20 may be movable to simulate an actual keypad and the LCD display 22 may be real. In still further embodiments, the LCD display 22 is coupled to a clock to generate a display of the current date and time.

In preferred embodiments, the plurality of hinges 18 are separate hinges formed from plastic. However, alternative embodiments, may utilize hinges formed from metal or other suitable materials, and/or may utilize a single hinge running the length of the telephone lid 14 and housing 12, such as a "piano hinge" or the like. Moreover, in other embodiments, the plurality of hinges 18 may be mounted at one end of the housing 12 and the corresponding end of the telephone lid 14 so that the telephone lid 14 opens up from an end, rather than a side.

Figure 2:
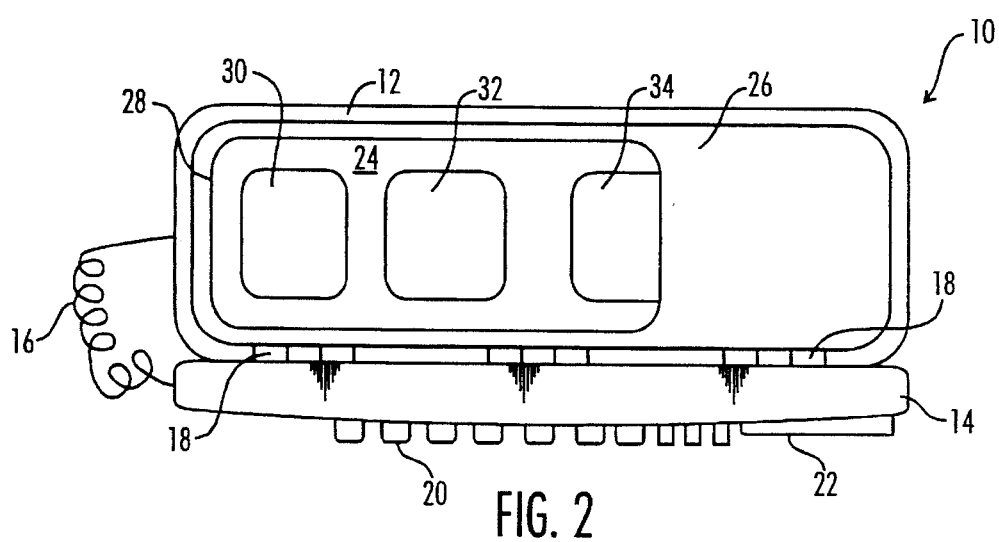
FIG. 2 is a top view of the embodiment shown in FIG. 1 in an open condition.
Figure 3:
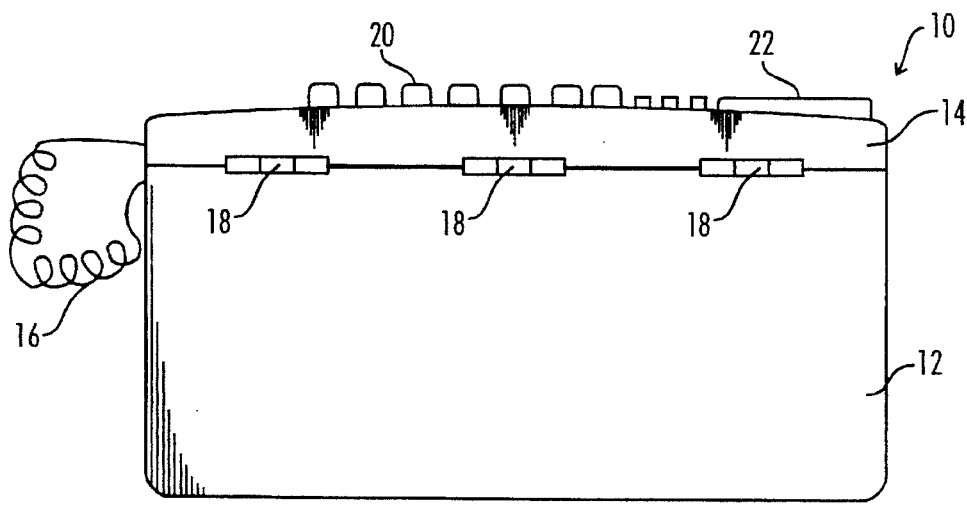
FIG. 3 is a side view of the embodiment shown in FIG. 1.

FIG. 2 shows a top view of the gun holder 10 with the telephone lid 14 opened to expose an interior 24 of the housing 12. FIG. 5 shows a cross-sectional view of the camouflaged gun holder 10 along the line 5—5 shown in FIG. 4. The interior 24 of the housing 12 contains a formed cushion 26 that is shaped to hold a gun 9. In preferred embodiments, the formed cushion 26 is made of sponge rubber. However, in alternative embodiments, the formed cushion may be made of styrofoam, synthetic foam, plastic, fabric, leather or any other combination of suitable materials. The formed cushion 26 holds the gun 9 securely to prevent damage to the gun 9, prevent accidental firing of the gun 9 due to shaking of the gun 9 as the vehicle moves, or maintain the gun 9 in a position that facilitates quick withdraw of the gun 9 from the interior 24 of the camouflaged gun holder 10.

The formed cushion 26 includes a hand access port 28 that provides access to the interior 24. The port 28 is wide enough to allow a closed hand grasping a butt and trigger of the gun 9 to pass through the port 28 with minimal contact and resistance. This permits rapid insertion and removal of the gun 9.

The formed cushion 26 also includes a butt recess 30, a trigger recess 32 and a muzzle recess 34. The butt recess 30 is adapted to receive the butt of the gun 9, the trigger recess 32 is adapted to cushion the trigger portion of the gun 9, and the muzzle recess 34 is adapted to receive the muzzle of the gun 9. The recesses 30, 32 and 34 hold the gun 9 so that it remains in an orientation that facilitates the removal of the gun 9. In the illustrated embodiment, the gun 9 is held at an orientation that allows the gun owner to insert one hand through the port 28 into the butt recess 30 and trigger recess 32 to grasp the gun 9.

In preferred embodiments, the recesses 30, 32 and 34 and the interior 24 are sized to hold a hand gun with a muzzle length of up to 6 inches. However, in alternative embodiments, different numbers and arrangements of recesses may be used to accommodate guns of various sizes and shapes. Moreover, the illustrated embodiment is adapted to hold a single gun. In alternative embodiments, the formed cushion 26 may include a plurality of separate access ports and recesses, each adapted to hold a gun, and thus a plurality of guns may be contained in a single camouflaged gun holder.

Figure 4:
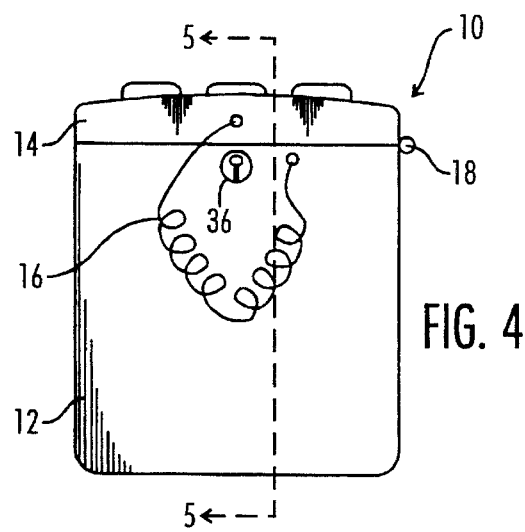
FIG. 4 is an end view of the embodiment shown in FIG. 1.
Figure 5:
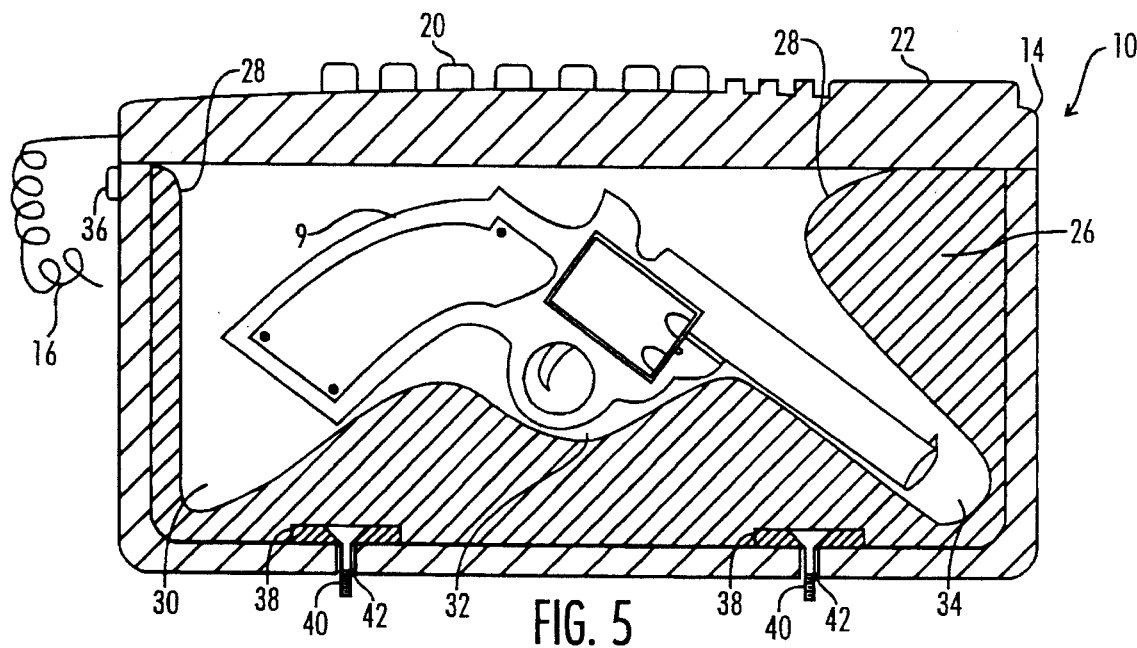
FIG. 5 is a cross-sectional view of the embodiment as shown along the line 5—5 in FIG. 4.

FIG. 4 shows an end view of the camouflaged gun holder 10 in which the camouflaged gun holder includes a lock mechanism 36. The illustrated lock mechanism 36 is locked and unlocked by a key (not shown). The lock mechanism 26 is utilized to lock the telephone lid 14 to the housing 12 to secure the gun inside the camouflaged gun holder and reduce the likelihood of the gun 9 being stolen. In alternative embodiments, a simple latch using a push button activator or magnets may be used to secure the telephone lid 14. In other embodiments, the buttons 20 on the simulated telephone lid 14 may be utilized to activate a combination lock mechanism, or other suitable locking mechanisms may be used to secure the telephone lid 14 to the housing 12.

FIG. 5 illustrates a preferred mounting structure that includes mounting plates 38, mounting screws 40 and screw holes 42. The screws 40 pass through the screw holes 42, in the mounting plates 38 and the housing 12, and are threaded into the floor 4 of the vehicle 1. This secures the camouflaged gun holder 10 to the vehicle 1 to prevent movement of the camouflaged gun holder 10 during motion of the vehicle 1. The screws 40 also make it more difficult to steal or remove the camouflaged gun holder 10 from the vehicle 1. The mounting plates 38 are used on embodiments of the camouflaged gun holder 10 in which the housing 12 is made of materials, such as plastic, that could be pulled off of the screws 40. However, in other embodiments where the housing 12 is made of stronger materials, such as metal or laminates, the mounting plates 38 may be eliminated.

In preferred embodiments, the formed cushion 26 is removed from the interior 24 of the camouflaged gun holder 10 when the screws 40 are secured to the floor 4 of the vehicle 1. However, in alternative embodiments, the formed cushion 26 may be provided with screw bore holes (not shown) passing through the formed cushion 26 so that the formed cushion 26 does not have to be removed during installation of the camouflaged gun holder 10 in a vehicle. In other alternative embodiments, the camouflaged gun holder 10 may be secured to the vehicle by rivets, nuts and bolts, adhesives, hook and loop tape, double sided tape or the like.

Preferred embodiments of the camouflaged gun holder 10 may be formed by injection molding techniques. The housing 12 is formed from an injection molded plastic to which the plurality of hinges 18, lock mechanism 36 and the mounting plates 38 are applied. The formed cushion 26 is formed by a separate injection molding step and is then inserted into the interior 24 of the housing 12. In preferred embodiments, the formed cushion 26 is secured to the housing 12 by friction. However, in alternative embodiments, the formed cushion 26 may be secured by adhesives or the like. The simulated telephone lid 14 is formed from plastic by a separate injection molding step, after which the buttons 20 are painted to resemble telephone pad keys and a display 22 is attached. The telephone lid 14 is then coupled to the housing 12 by the plurality of hinges 18. Finally, the telephone cable 16 is attached to both the telephone lid 14 and the housing 12.

In preferred embodiments, the telephone cable 16 is attached by adhesives. However, in alternative embodiments other suitable connection methods such as screws, knots or the like, may be utilized. In further embodiments, the telephone lid 14 and housing 12 may be formed as a single integrated unit using plastic hinges 18 so that the telephone lid 14 and the housing 12 may be formed in a single injection mold, and thus reduce assembly costs.

In alternative embodiments, an operable cellular telephone (or other device) is used instead of a simulated telephone lid 14. For example, the lid 14 is modified to act as a cradle for an operable cellular telephone. The cradle secures the cellular telephone when the cellular telephone is not in use and when the lid 14 is opened and closed. Moreover, both the lid 14 and the housing 12 are modified to include a channel for passing wires to the cellular telephone. In particular embodiments, the lid 14 and the housing 12 use thicker plastic materials or metal to support the additional weight of the cellular telephone.

Figure 6:
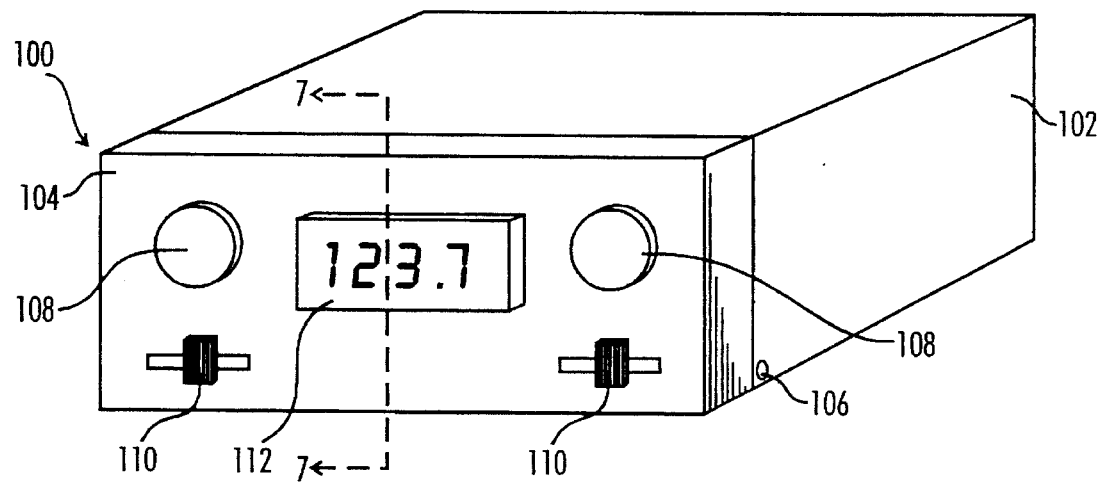
FIG. 6 is a perspective view of a camouflaged gun holder according to a second embodiment of the present invention.
Figure 7:
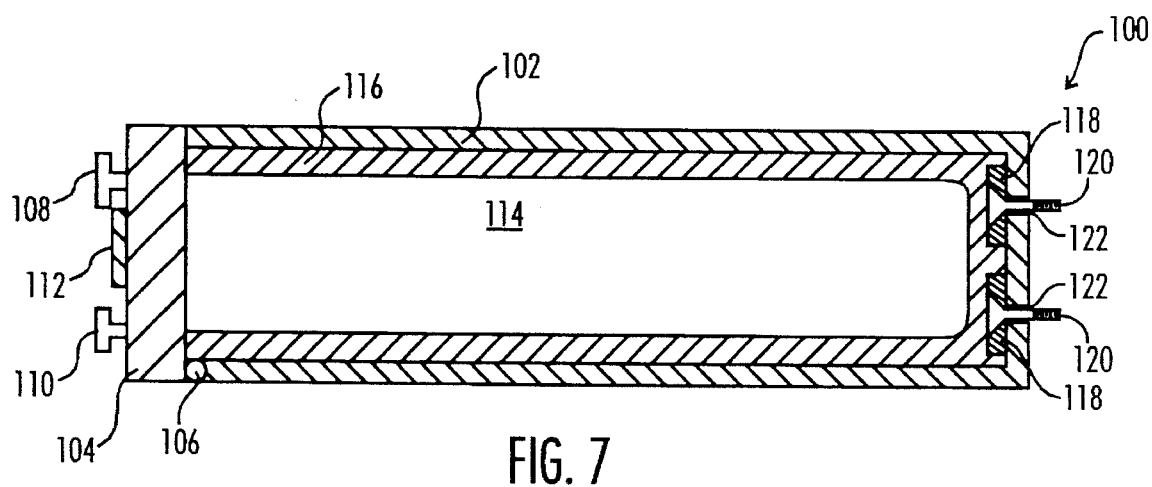
FIG. 7 is a cross-sectional view of the embodiment as shown along the line 7—7 in FIG. 6.

FIGS. 6 and 7 illustrate a camouflaged gun holder 100 in accordance with a second embodiment of the present invention. In preferred embodiments, the camouflaged gun holder 100 has dimensions suitable for fitting within the dashboard to simulate the appearance of an in-dash vehicle stereo. In alternative embodiments, the camouflaged gun holder 100 may be mounted below the dash board, and may simulate other devices, such as a CD player, citizen band radio (CB) radio or the like. In still other embodiments, the camouflaged gun holder 100 may utilize an operable radio, CD player or CB radio instead of a simulated device.

As shown in FIG. 6, the camouflaged gun holder 100 includes a gun holding housing 102, a simulated radio cover 104, and a hinge 106. The gun holding housing 102 is coupled to the radio cover 104 by the hinge 106. Embodiments of the camouflaged gun holder 100 may be formed in the same manner or utilize the same materials as described above in the previous embodiment. The radio cover 104 includes knobs 108, sliding switches 110 and a display 112 to simulate the appearance of a radio.

In preferred embodiments, the knobs 108 and the switches 110 are not movable and are formed as an integrated part of the radio cover 104. However, in alternative embodiments, the knobs 108 and switches 110 are movable. In still further embodiments, the knobs 108 and switches 110 may be utilized as part of a locking mechanism (not shown). For example, the knobs 108 and switches 110 would have to be positioned in particular positions to unlock a lock mechanism. The display 112 may be a simulated display or an operable LCD display, LED display or the like, coupled to a clock or the like.

FIG. 7 is a cross-sectional diagram of the camouflaged gun holder 100 as Shown along the line 7—7 in FIG. 6. The housing 102 encloses an interior 114 for holding a gun. The interior 114 includes a formed cushion 116 that holds the gun to damp out noise when the vehicle moves, to prevent damage to the gun, and prevent accidental firing of the gun. The interior 114 is dimensioned so that a gun owner may easily insert and withdraw the gun from the camouflaged gun holder 100. In preferred embodiments, the formed cushion has a rectangular interior cavity. However, in alternative embodiments, the formed cushion 116 may be formed with recesses similar to those described in the first embodiment, or may be formed with a plurality of ridges and valleys in a waffle pattern or the like.

FIG. 7 illustrates that the camouflaged gun holder 100 is secured to the dashboard of the vehicle by mounting plates 118 and screws 120 that pass through screw bores 122. In preferred embodiments, the camouflaged gun holder is mounted within the dash board in a location where a radio would normally be mounted. However, in alternative embodiments, the camouflaged gun holder 100 is mounted below the dash board. Moreover, other embodiments of the camouflaged gun holder 100 may be secured to a vehicle using similar methods and materials as described above for the first embodiment.

Two embodiments have been described. However, in alternative embodiments, the camouflaged gun holder may be formed so that it can be inserted and secured within an existing arm rest or glove compartment of a vehicle. Moreover, other embodiments, my be made substantially longer that the illustrated embodiments (i.e., simulating a transmission channel on the floor of a vehicle) to accommodate longer guns, such as rifles shotguns or the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A camouflaged item holder for holding at least one item in an anterior of a vehicle, the holder comprising:

a housing having an interior for holding at least one item and having an opening to the interior, and the housing having an exterior shaped to match with a portion of the interior of the vehicle;

a lid having an appearance of a portion of an electronic device for use in the interior of the vehicle, and having dimensions to cover the opening to the interior of the housing;

at least one hinge that couples the housing to the lid so that the lid can be opened and closed; and at least one mounting structure that is used to firmly secure and couple the housing to the interior of the vehicle to prevent movement of the housing relative to the vehicle;

wherein when the lid is in a closed position, the lid and housing appear like a Single unit having a function other than holding an item such that the presence of the at least one item is camouflaged inside the interior of the vehicle.

2. A holder according to claim 1, wherein the housing and the mounting structure are shaped to conform to a surface of the interior of the vehicle when coupled to an interior surface in the interior of the vehicle.

3. A holder according to claim 1, wherein the mounting structure is secured to the vehicle by screws.

4. A holder according to claim 1, wherein the mounting structure is secured to the vehicle by adhesives.

5. A holder according to claim 1, wherein the mounting structure is secured to the vehicle by hook and loop tape.

6. A holder according to claim 1, wherein the housing and mounting structure are secured to a floor of the vehicle.

7. A holder according to claim 1, wherein the interior of the housing contains a formed cushion to hold the item in a readily accessible position inside the interior of the camouflaged item holder.

8. A holder according to claim 7, wherein the formed cushion is formed from a spongy material to absorb shocks from movement of the vehicle.

9. A holder according to claim 1, wherein the holder further includes a lock mechanism to secure and lock the lid to the housing when the lid is in the closed position.

10. A holder according to claim 9, wherein the portion of the device on the lid simulates an operable electronic device.

11. A holder according to claim 9, wherein the portion of the device on the lid is an operable electronic device.

12. A holder according to claim 9, wherein the housing and the lid are formed from a plastic material.

13. A camouflaged gun holder for holding at least one gun in an interior of a vehicle that is accessible by a hand, the holder comprising:

a housing having an interior portion for holding at least one gun and having an opening to the interior portion dimensioned to admit the hand holding the at least one gun, and the housing having an exterior shaped to match with a portion of the interior of the vehicle;

a formed cushion contained in the interior portion of the housing to hold the at least one gun in a readily accessible position inside the interior portion of the gun holder;

a lid having an appearance of an electronic device for use in the interior of the vehicle, and which is dimensioned to cover the opening to the interior portion of the housing;

at least one hinge that couples the housing to the lid so that the lid can be opened and closed;

at least one mounting structure that firmly secures and couples the housing to the interior of the vehicle to prevent relative movement of the housing to the vehicle; and at latch to secure the lid to the housing when the lid is in the closed position;

wherein when the lid is in a closed position, the lid and the housing appear like a single unit having a function order than holding a gun such that the presence of the at least one gun is camouflaged in the interior of the vehicle.

14. A gun holder according to claim 13, wherein the lid simulates a cellular telephone.

15. A gun holder according to claim 13, further including a telephone cord that is coupled between the lid and the housing, wherein the lid simulates an operable cellular telephone, wherein the housing simulates a base support for the cellular telephone, and wherein the single unit appears like a cellular telephone mounted on the base.

16. A gun holder according to claim 13, wherein the lid is an operable electronic device.

17. A gun holder according to claim 13, wherein the housing and the lid are formed from a plastic material.

18. A gun holder according to claim 13, wherein the formed cushion is formed from a spongy material to absorb shocks from movement of the vehicle.

19. A camouflaged gun holder for holding at least one gun in an interior of a vehicle that is accessible by a hand of a user, the holder comprising:

a housing having an interior portion for holding at least one gun and having an opening to the interior portion dimensioned to admit the entire hand when closed around the at least one gun, and the housing having an exterior externally shaped to match and blend with a portion of the interior of the vehicle;

a formed cushion contained in the interior portion of the housing to hold the at least one gun in a readily accessible position by the entire hand inside the interior portion of the gun holder;

a lid having an appearance of a cellular telephone for use in the interior of the vehicle, and which is dimensioned to cover the opening to the interior portion of the housing;

at least one hinge that couples the housing to the lid so that the lid can be opened and closed;

a telephone cable coupled between the housing and the lid to simulate wires used by the cellular telephone;

at least one mounting structure that uses screws to firmly secure and couple the housing to the interior of the vehicle to prevent relative movement of the housing to the vehicle; and a latch to secure the lid to the housing when the lid is in the closed position;

wherein when the lid is in a closed position, the lid and the housing appear like a single unit having a function other than holding a gun such that the presence of the at least one gun is camouflaged in the interior of the vehicle.

20. A holder according to claim 19, wherein the housing and the mounting structure are shaped to conform to a surface of the interior of the vehicle when coupled to an interior surface in the interior of the vehicle.

* * * * *